US011866315B2

(12) United States Patent
Hurd et al.

(10) Patent No.: US 11,866,315 B2
(45) Date of Patent: Jan. 9, 2024

(54) BEVERAGE APPARATUS AND METHOD

(71) Applicant: SUM LLC, Birmingham, AL (US)

(72) Inventors: Tyler G. Hurd, Birmingham, AL (US); Lloyd G. B. Cooper, Birmingham, AL (US); Foster Daniel Phillips, Birmingham, AL (US); Daniel Jacob Bolus, Birmingham, AL (US); Tarek Midani, Birmingham, AL (US)

(73) Assignee: SUM LLC, Birmingham, AL (US)

( * ) Notice: Subject to any disclaimer, the term of this patent is extended or adjusted under 35 U.S.C. 154(b) by 0 days.

(21) Appl. No.: 17/778,379

(22) PCT Filed: Nov. 18, 2020

(86) PCT No.: PCT/US2020/061049

§ 371 (c)(1),
(2) Date: May 19, 2022

(87) PCT Pub. No.: WO2021/101990

PCT Pub. Date: May 27, 2021

(65) Prior Publication Data

US 2023/0020707 A1 Jan. 19, 2023

Related U.S. Application Data

(60) Provisional application No. 62/937,915, filed on Nov. 20, 2019.

(51) Int. Cl.

| | |
|---|---|
| ***B67D 1/00*** | (2006.01) |
| ***B67D 1/08*** | (2006.01) |
| ***B67D 1/12*** | (2006.01) |

(52) U.S. Cl.

CPC ......... *B67D 1/0031* (2013.01); *B67D 1/0078* (2013.01); *B67D 1/0857* (2013.01); *B67D 1/1279* (2013.01); *B67D 2210/00002* (2013.01)

(58) Field of Classification Search

CPC .. B67D 1/0031; B67D 1/0078; B67D 1/0857; B67D 1/1279; B67D 2210/00002; B67D 1/0869; B67D 2001/0093; B67D 2210/0001; B67D 1/004; B67D 1/07; E03C 1/044; E03C 2201/40

See application file for complete search history.

(56) References Cited

U.S. PATENT DOCUMENTS

| | | | | |
|---|---|---|---|---|
| 2006/0021919 A1* | 2/2006 | Olson | .................. | B01F 35/213 210/85 |
| 2017/0203947 A1* | 7/2017 | James | .................... | B65D 85/00 |
| 2020/0031651 A1* | 1/2020 | Schneidewend | ..... | B67D 1/0888 |

* cited by examiner

*Primary Examiner* — Donnell A Long
(74) *Attorney, Agent, or Firm* — Joseph S. Bird, III; Maynard Nexsen PC

(57) ABSTRACT

A beverage apparatus and system is disclosed. The beverage apparatus is configurable to add flavors, minerals, vitamins, or other such additives to a source fluid, such as purified water, in response to a user's selection of settings, to provide a customized beverage. Advantageously, the beverage apparatus uses the purified water to cleanse the components that come into contact with the additive as part of the preparation of each beverage and includes this cleansing wash as part of the beverage itself, thus providing a self-cleaning apparatus that does not require a separate drain.

19 Claims, 8 Drawing Sheets

FIG. 5
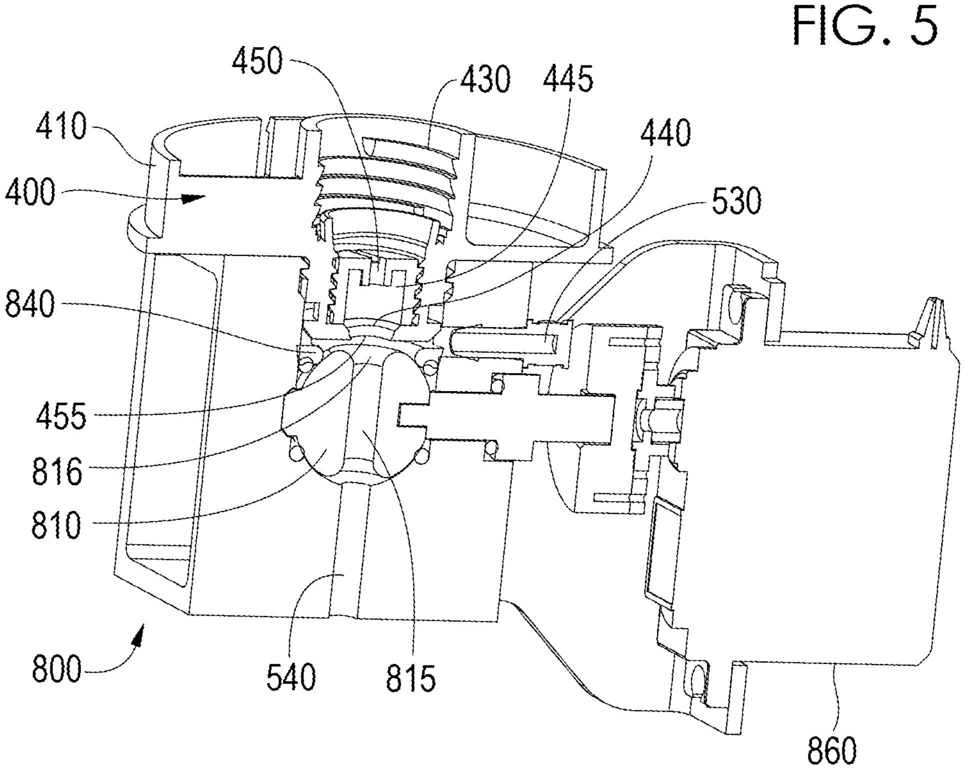
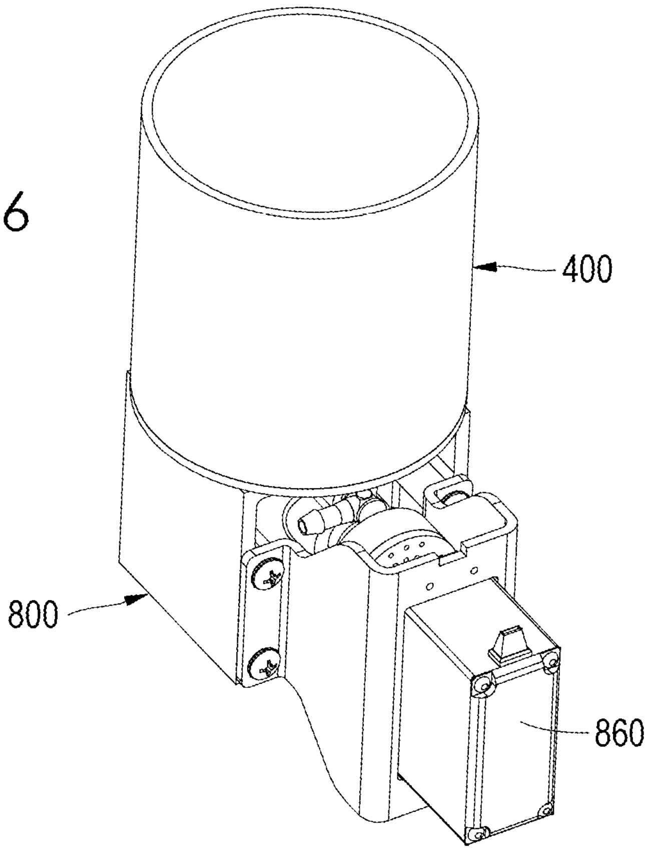
FIG. 6

BEVERAGE APPARATUS AND METHOD

TECHNICAL FIELD

The present disclosure relates to a self-cleaning apparatus for dispensing and mixing additives into a fluid for providing a customized beverage for consumption.

BACKGROUND

Most drinking water dispensing systems use tap water supplied from municipal drinking water plants or private wells. However, due to health safety and water quality concerns related to these sources of drinking water, bottled water has become increasingly popular. Bottled water is far more expensive than tap, requires far more resources for distribution, and the plastics from these bottles are a significant burden on the environment. Plastic bottles primarily end up in landfills or oceans, resulting in environmental degradation, since air, climate, or soil cannot break them down naturally.

As consumers continue to demand healthier beverage alternatives, purified, vitamin, electrolyte, flavor infused, and functional "craft" water popularity has increased substantially. Currently, consumers have limited options when it comes to producing said water at home or on-the-go without single-use plastic bottles.

Some existing systems surrounding conventional drinking water supply devices relate to a device that supplies safe drinking water to a user. The drinking water supply device may be a water purifier, a water filter, an activated carbon filter, a RO (Reverse Osmosis) system, or a water distiller. The drinking water supply device may supply cold or hot water to a user as needed.

Other existing devices relate to techniques to remove specific contaminants, such as specialized filtration additives to aid in the adsorptions of specific chemicals, or remove heavy metals, bacteria, radiologic, and other organic and inorganic contaminants. Many pathogens can also be effectively killed by adding UV lights to drinking water devices.

The performance of many existing drinking water supply devices relate to their purification ability or contaminant removal performance, and are not related to how or what they add back into the drinking water. In addition, higher performing systems may remove nearly all contaminants, including beneficial minerals, such as in the case of RO and distillation devices, and may result in elevated pH, loss of nutritional value, and no notable taste of the drinking water.

According to scientific research, for a human body, healthy drinking water should be weak alkaline water (pH 6.5-8.5) and should contain certain minerals that are beneficial to human health. It is known that mineral water can be produced with the use of salts and mineral-adding cartridges as a post-treatment option for RO or simple water dispensing devices. These cartridges use solid minerals or salts, which dissolve at a given rate as purified water flows through the cartridge. One problem that can arise with this approach is that the rate at which the minerals dissolve cannot be easily regulated and may change over time, creating variability of effluent water mineral concentration.

Another common problem with adding minerals, flavoring, or any beverage additive to drinking water via drinking water supply devices is scale build-up and fouling. Minerals and other additives tend to crystallize and create scale build-up when introduced to open atmosphere. The scale deposits may reduce efficiency at the outlet as a result, and the flow of minerals may be obstructed causing further inconsistencies in the quality of the effluent water and potential failure of the device.

Some existing systems use compressed air is to clean, or "purge", dosing lines containing concentrated additives in order to prevent scaling and fouling. This purge process requires tanks of compressed gas and a means of draining the discarded fluid, both of which add significant cost and complexity to the device.

Therefore, the prior art fails to define a water filtration or dispensing system capable of producing water containing a predetermined concentration of select additives with a high degree of accuracy and consistency, that is self-cleaning without requiring the use of a drain or compressed gas.

Further, in a device that supplies additives to drinking water, it would be desirable for these concentrated liquid additives to be contained within a cartridge that may be easily added and removed from the device without compromising dosing system efficacy.

Thus, there may be a need for an apparatus and method that can deliver liquid concentrated additives from removeable cartridges into a purified water stream through micro-dosing channels, thus supplying users with mineral, vitamin, flavored, alkaline, or other types of enhanced water with a high degree of precision and consistency from consumable, removeable cartridges. There may be a further need for an apparatus that can provide individually customized beverages, and still further for an apparatus that can do so in a touch-free manner.

Some embodiments of the present invention satisfy one or more of these needs. Some embodiments define an apparatus that allows users to create purified water, customized to their choosing, dispensed without direct contact between the user and the device. An embodiment may combine water filtration, removable cartridges, a vessel in wireless electronic communication with the device, and micro-dosing of concentrated liquid minerals, vitamins, flavors and other beneficial additives that may be desirable to add to drinking water. Systems contemplated herein aim to offer easy access to customized beverages without single-use plastics to improve individual health and support environmental sustainability.

BRIEF DESCRIPTION OF THE DRAWINGS

FIG. 5 is a sectional view of the bottom of a cartridge and of a dosing pump of the embodiment of FIG. 1;

FIG. 6 is a perspective view of the bottom of a cartridge and of a dosing pump of the embodiment of FIG. 1;

SUMMARY

Figure 1:
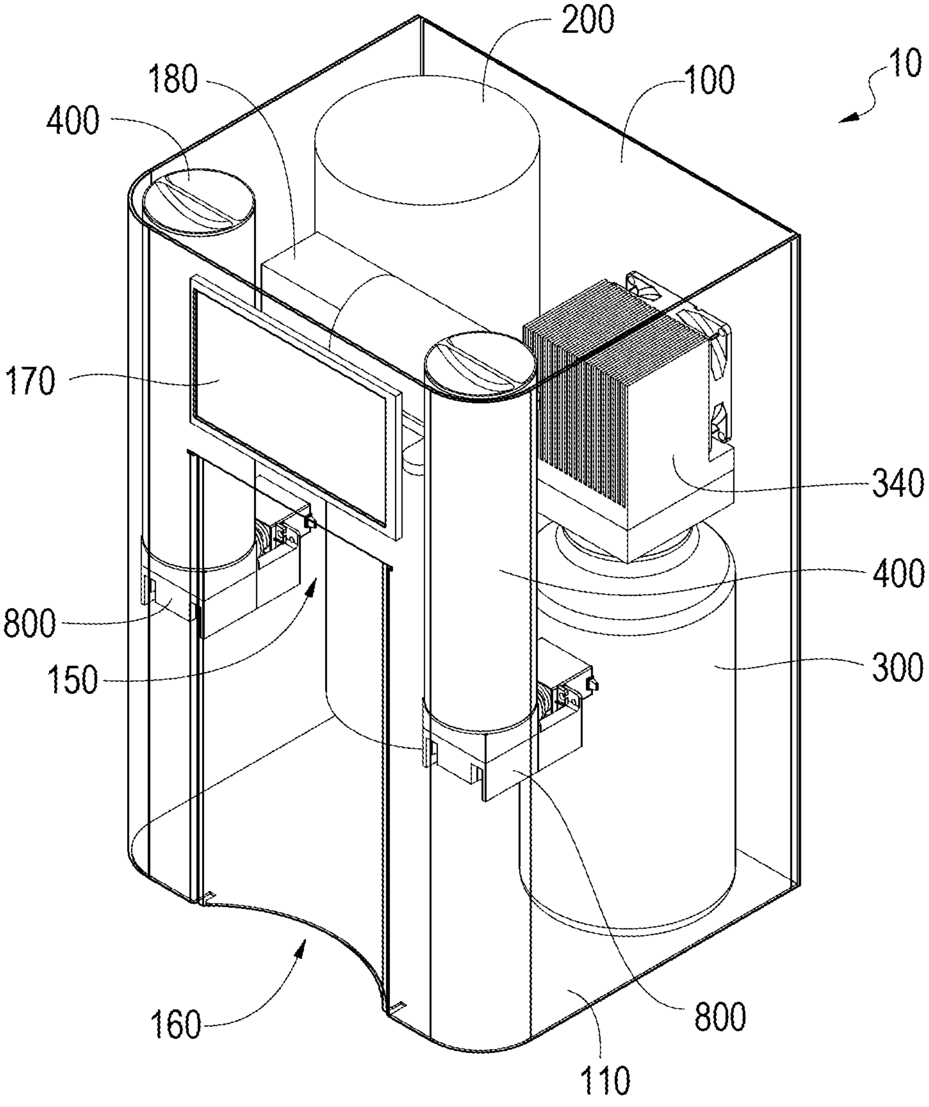
FIG. 1 is a perspective view of an embodiment of an invention of this disclosure, with its outer shell shown as transparent and with the inner frame (shown in FIG. 2) removed to show the inner components of the system.

One embodiment of the present invention is a beverage apparatus having a supply line that receives a source of fluid, a dosing line, a main flow line coupled to each of the supply line and the dosing line and having a beverage outlet, and a dosing valve. The valve includes a chamber having an opening for receiving a fitting associated with a cartridge containing an additive, a fluid inlet coupled to the supply line, an outlet coupled to the dosing line, and a dosing ball disposed within the chamber and between the opening, the fluid inlet, and the outlet. The dosing ball is configured to rotate from a first position to a second position and has a tubular port substantially perpendicular to the axis of rotation of the dosing ball, wherein in the first position the port permits fluid to flow from the fluid inlet to the outlet and in the second position the dosing ball permits additive to flow from the fitting to the outlet. In one embodiment, with the dosing ball in the first position, the fluid upon exiting the port flows across a surface of the fitting exposed in the opening thereby cleansing the exposed surface of any additive disposed on it. The fluid may be, for example, purified water.

In a preferred embodiment, the beverage apparatus also includes a dosing pump coupled to the dosing line and a controller. The controller is configurable to control fluid flow through the supply line to supply a predetermined amount of fluid to the main flow line for a beverage and to actuate the valve into the second position while actuating the dosing pump to dispense a predetermined amount of additive through the dosing line to the main supply line, and to actuate the valve into the first position while actuating the dosing pump to flush a predetermined amount of fluid through the dosing line and to the main supply line. The luid flushed through the dosing line is dispensed into a beverage, thereby cleansing said valve, dosing line, and main line without a drain.

In yet a still preferred embodiment, the fitting for receiving the cartridge is positioned above the valve to permit gravity flow of the additive from the cartridge into the valve. The fitting is adapted for a removable cartridge. In still further embodiments, the beverage apparatus may include two or more valves, each having an opening to receive a fitting associated with its own cartridge, and having an inlet and outlet, coupled respectively to the supply line and a dosing line as described above. This embodiment permits multiple additives to be mixed with the fluid and into the beverage.

Embodiments of the beverage apparatus may also include one or both of a fluid purification system in line with the supply line for purifying the fluid received from the source and a cooling system in line with the supply line for cooling the fluid to a desired temperature. In a still preferred embodiment, the cooling system may include a removable storage tank with a cap, where the cap comprises an integrated heat exchanger and a cooling core extending into the storage tank.

Another embodiment of the present invention is a self-cleaning beverage apparatus that includes a supply line for receiving a source of fluid that is coupled to a dispensing valve for regulating the flow of the fluid through the supply line, a dosing line coupled to a dosing valve for alternatively receiving fluid from the supply line or from a source of additive and coupled to a dosing pump for metering the flow of the fluid or additive through the dosing line, a main flow line in fluid communication with each of the supply line and the dosing line and having a beverage outlet, and a controller. The controller is operatively coupled to the dispensing valve, the dosing valve, and the dosing pump, and is configurable to actuate the dispensing valve to supply a predetermined amount of fluid to the main flow line for a beverage, to actuate the dosing valve and dosing pump to dispense a predetermined amount of additive through the dosing line to the main supply line, and to actuate the dosing valve and dosing pump to flush a predetermined amount of fluid through the dosing line and to the main supply line for dispensation into a beverage container. In this way, the dosing valve, dosing line, and main supply line may be cleansed during the preparation of a beverage without the need for a drain.

In a preferred embodiment, the dosing valve of this beverage apparatus of claim 11, wherein said a valve comprises a chamber having an opening for receiving a fitting associated with a cartridge containing the additive, a fluid inlet coupled to the supply line, an outlet coupled to the dosing line, and a dosing ball disposed within the chamber and between the opening, the fluid inlet, and the outlet and configured to rotate from a first position to a second position in response to the controller, the dosing ball comprising a tubular port substantially perpendicular to the axis of rotation of the dosing ball, wherein in the first position the port permits fluid to flow from the fluid inlet to the outlet and in the second position the dosing ball permits additive to flow from the fitting to the outlet. Preferably, in the first position, upon exiting the port, fluid flows across a surface of the fitting exposed in the opening thereby cleansing the exposed surface of any additive disposed on it. Also, the fitting for receiving the cartridge may be positioned above the valve to permit gravity flow of the additive from the cartridge into the valve. The fitting is adapted for a removable cartridge. In still further embodiments, the beverage apparatus may include two or more dosing valves, each having an opening to receive a fitting associated with its own cartridge, and having an inlet and outlet, coupled respectively to the supply line and a dosing line as described above. This embodiment permits multiple additives to be mixed with the fluid and into the beverage.

Embodiments of the beverage apparatus may also include one or both of a fluid purification system in line with the supply line for purifying the fluid received from the source and a cooling system in line with the supply line for cooling the fluid to a desired temperature. In a still preferred embodiment, the cooling system may include a removable storage tank with a cap, where the cap comprises an integrated heat exchanger and a cooling core extending into the storage tank.

Another embodiment of the present invention is beverage system that includes a beverage apparatus configurable to dispense a beverage prepared in response to a selection of settings and a container comprising a wireless communications device from which the beverage apparatus may receive information associated with at least one set of selected settings. The information may be indicative of a user profile, which in turn includes or is associated with at least one set of selected settings. The settings may include additive selection, concentration, beverage temperature, and like. The user profile may be stored on the beverage apparatus or remotely from the beverage apparatus on a communications network to which the beverage apparatus is capable of being operatively connected.

The beverage apparatus of this system may include a supply line that receives a source of fluid, a dosing line, a main flow line coupled to each of the supply line and the dosing line and having a beverage outlet, and a dosing valve. The valve includes a chamber having an opening for receiving a fitting associated with a cartridge containing an additive, a fluid inlet coupled to the supply line, an outlet coupled to the dosing line, and a dosing ball disposed within the chamber and between the opening, the fluid inlet, and the outlet. The dosing ball is configured to rotate from a first position to a second position and has a tubular port substantially perpendicular to the axis of rotation of the dosing ball, wherein in the first position the port permits fluid to flow from the fluid inlet to the outlet and in the second position the dosing ball permits additive to flow from the fitting to the outlet. The beverage apparatus may include any and all of the features of the other embodiments described above, including the configurable controller, the dosing pump, the dispensing valve, the multiple dosing valves each associated with a cartridge, fluid purification and cooling systems.

DETAILED DESCRIPTION

Embodiments of the present invention relate to a beverage system for introducing additive(s) into a fluid stream from a fluid source, preferably still tap water, to dispense a customized beverage. The apparatus advantageously includes user-replaceable additive cartridges, a control system and associated actuators and pumps, and a self-cleaning mechanism and process to accurately meter the additive(s) and consistently dispense a desired beverage.

Figure 2:
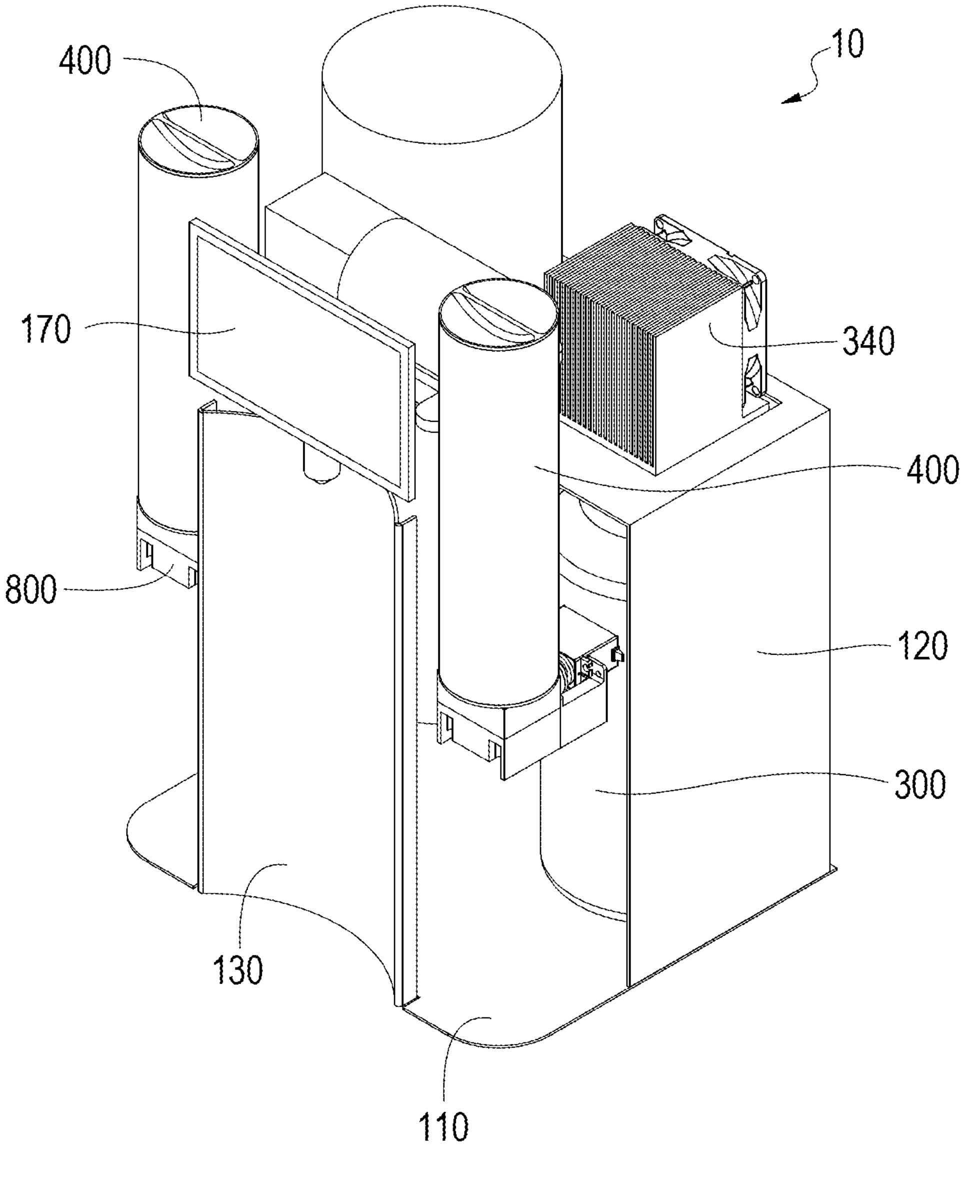
FIG. 2 is a perspective view of the embodiment of FIG. 1, in which the outer shell has been removed and illustrating the inner frame.

FIG. 1 is a perspective view of one embodiment of a beverage system 10 shown with its outer shell 100 as transparent. As shown in FIGS. 1-2, beverage system 10 comprises a base 110 supporting a frame 120 and front support 130. The outer shell 100 removably fits over the frame 120 and on and into front support 130 and the base 110. The beverage system further comprises a fluid inlet 140 (not shown), a beverage outlet 150, and a dispensing bay 160. A display 170, such as an LCD or other flat-panel display, and an electronics module 180 may be supported by front support 130 or body 110. The electronics module 180 includes hardware, firmware, and software for system control, communications, and networking functionality (such as Wi-Fi, Bluetooth, near-field communications or any similar protocol known in the art) as described herein. An appropriate power supply (not shown), which may include an optional back-up battery pack, receives line power and converts it to appropriate direct current for supplying power to the electronics module as well as the other components described herein that require electrical power. The beverage system 10 also includes a purification system 200, a storage tank 300, and at least one cartridge 400 that contains a desired additive, which in the present embodiment is in liquid form.

Figure 3:
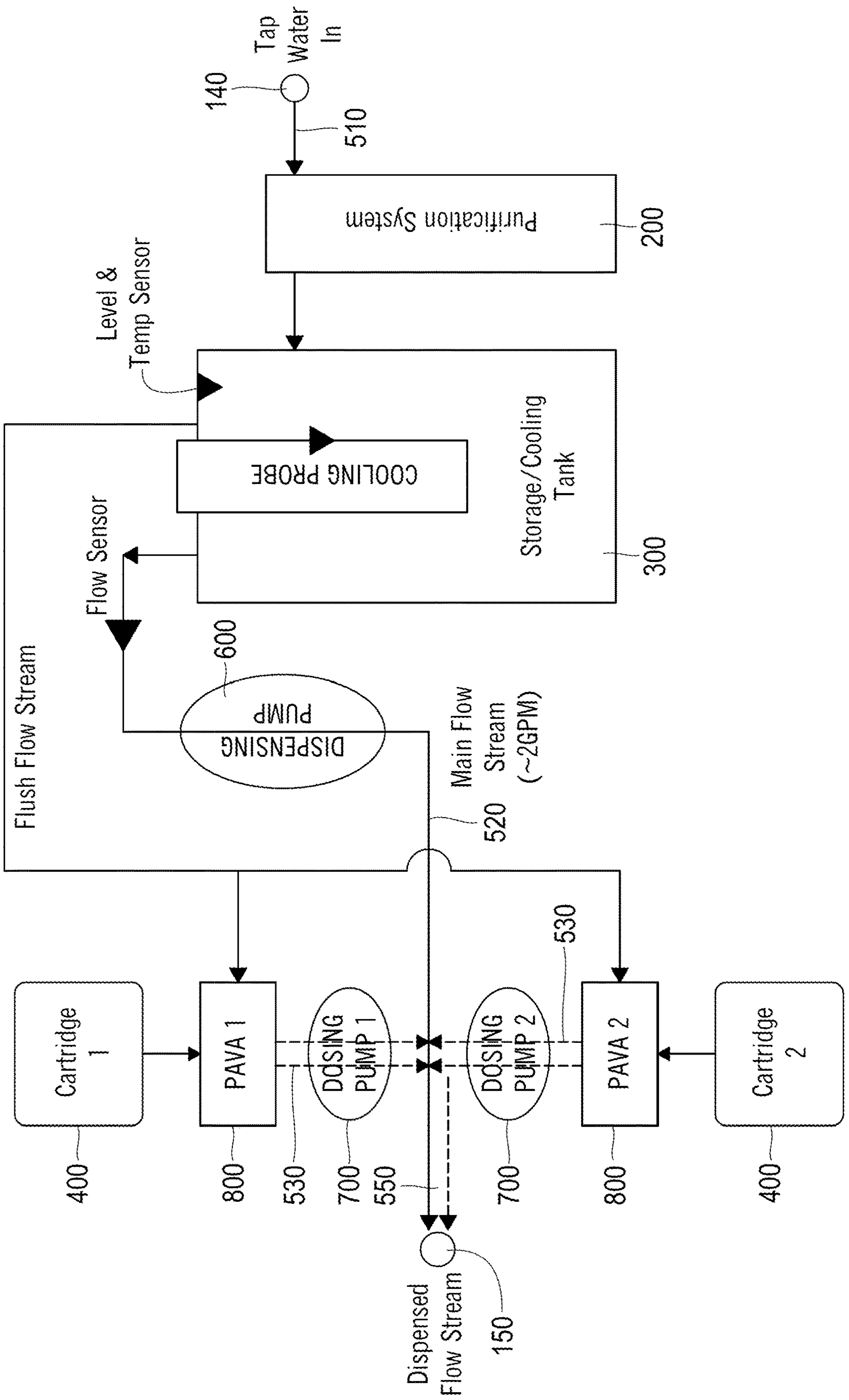
FIG. 3 is a schematic illustration showing the arrangement of certain components of the embodiment of FIG. 1 and the flow of certain fluid lines with respect thereto.

As shown schematically in FIG. 3, the purification system 200 is in fluid communication with inlet 140 and storage tank 300. In a preferred embodiment, the purification system 200 comprises a carbon-based microfilter, although other purification systems as known in the art may be used. For example, a distillation system may be substituted for filter-based purification. Tap water flows from the inlet 140 through a supply line 510 into purification system 200. In a still preferred embodiment the inlet 140 includes a standard threaded connector for receiving a pressurized supply line connected to the main water supply of the premises in which the beverage system 10 is located. In alternative embodiments, inlet 140 may connected to a reservoir or other water source driven by gravity or a pump. Purified water exits the purification system 200 and flows into storage tank 300. The storage tank 300 is in fluid communication with beverage outlet 150 via a main flow line 520, and fluid flow may be driven by the pressurized source (controlled by a dispensing valve that may be actuated by a solenoid) or driven by a dispensing pump 600. The cartridges 400 are in fluid communication with the main flow line 520 via dosing lines 530 as regulated and driven by dosing pumps 700 and dosing valves 800. The dispensing pump 600 (or alternatively, dispensing valve), dosing pumps 700, and dosing valves 800 are actuated and controlled by the electronics module 180 as described herein. The main flow line 520 and dosing flow lines 530 converge to form the dispensed flow stream 550 which exits the beverage system 10 at beverage outlet 150 into a cup or other receptacle placed in the dispensing bay 160 by a user.

Figure 4:
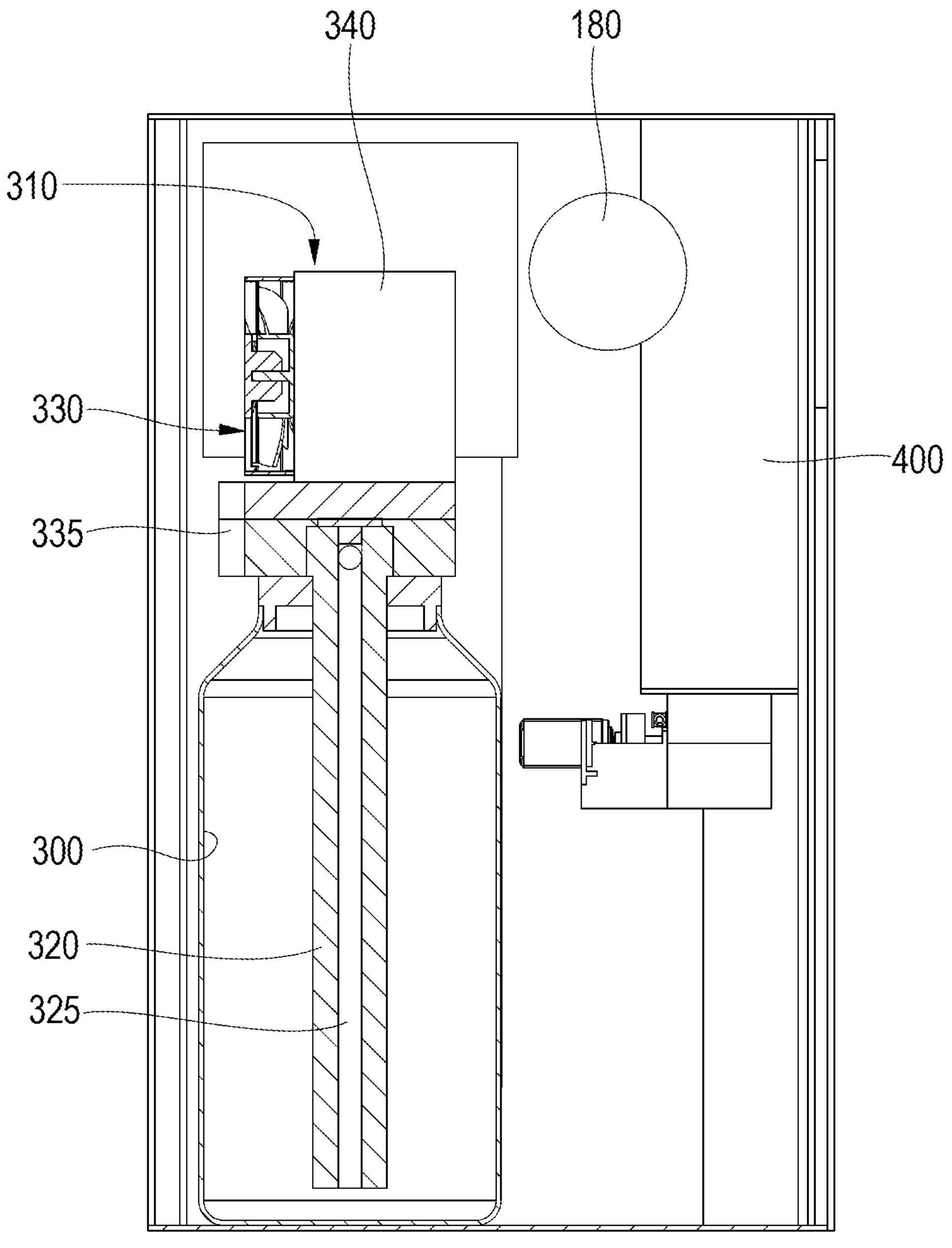
FIG. 4 is a transparent side view of the storage tank of the embodiment of FIG. 1.

Referring to FIG. 4, the storage tank 300 preferably is a thermally insulated vessel and comprises a cooling system 310 to reduce the temperature of the water source to a desired level and thus hold prechilled water for dispensation. For example, in many areas tap water is about 61° F., and it may be desired to cool it in the storage tank 300 to approximately 40° F. before dispensation from the beverage system 10, although a higher or lower temperature could be selected as desired via the user interface provided on the display 170 by the software included within and run by electronics module 180. In one embodiment, storage tank 300 is a commercially available, double-walled, vacuum-sealed stainless steel vessel, optionally with a narrowed neck that may be threaded for receiving a cap. The cooling system 310 may comprise an elongated cooling core 320 with an integrated supply tube 325 in a vertical orientation within the storage tank 300 in thermal communication with a heat exchanger 330 such as a peltier device 335 and heat sink 340 as shown. The heat sink 340 may further comprise a fan to dissipate heat. The components of the cooling system are appropriately powered by the power supply of the beverage system 10. The cooling core 320 is a material with a high coefficient of thermal conductivity such as stainless steel, copper, or other metal, and in conjunction with the heat exchanger 330 removes heat from the water in storage tank 300 thus cooling it. Other cooling systems known in the mechanical arts may be used in place of the embodiment described herein. The cooling system 310 preferably includes a temperature sensor and is operably connected to electronics module 180 and for actuating and controlling the system to cause the water in storage tank 300 to reach and maintain a desired temperature.

In a still preferred embodiment, the cooling core 320 and the heat exchanger 330 (which in the embodiment described herein includes the peltier device 335 and heat sink 340) are mechanically coupled and integrated into a cap for the storage tank 330. The cap of cooling system 310 may mechanically interlock, such as by a threaded connection or clamp, with the opening of the storage tank 330 to provide a secure and thermally efficient connection. In this embodiment, the cap includes a receptacle in fluid communication with the interior of the storage tank 300 for coupling to the supply line from the purification system to fill the tank. Likewise, the cap includes a receptacle in fluid communication with the integrated supply tube 325 in the cooling core 320 for coupling to the main flow line 520, to allow the dispensing pump 600 to draw fluid (e.g., prechilled water) from the storage tank 300 through the supply tube 325.

Depending on the configuration of the main fluid supply (i.e., whether it is a pressurized supply, or a gravity-based or pump-driven reservoir), the supply to the storage tank 300 is regulated by a valve (such as the solenoid-driven dispensing valve) or pump, or combination thereof. The storage tank 300 preferably includes a level sensor 350, which may be simple float-style sensor, in communication with the control system to actuate the dispensing valve or pump to fill the storage tank and maintain its contents at a desired level. In one embodiment, the storage tank 300 holds four liters of water. Thus, the cooling system 310 in combination with the level sensor 350 allows the beverage system 10 to maintain a reserve of prechilled water ready for dispensation.

Figure 9A:
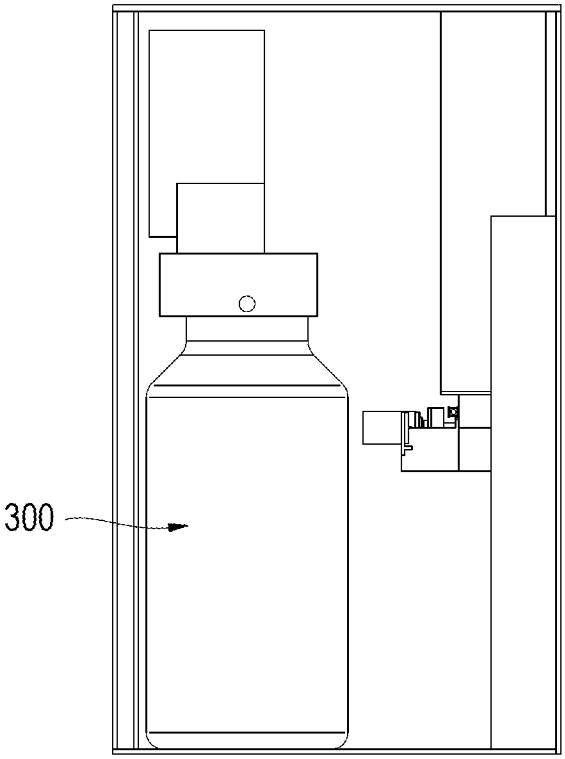
FIGS. 9A-B are partial internal side views of a portion of the embodiment of FIG. 1 illustrating the storage tank in an in-use position (FIG. 9A) and pivoted outwards into a position to facilitate removal and cleaning.
Figure 9B:
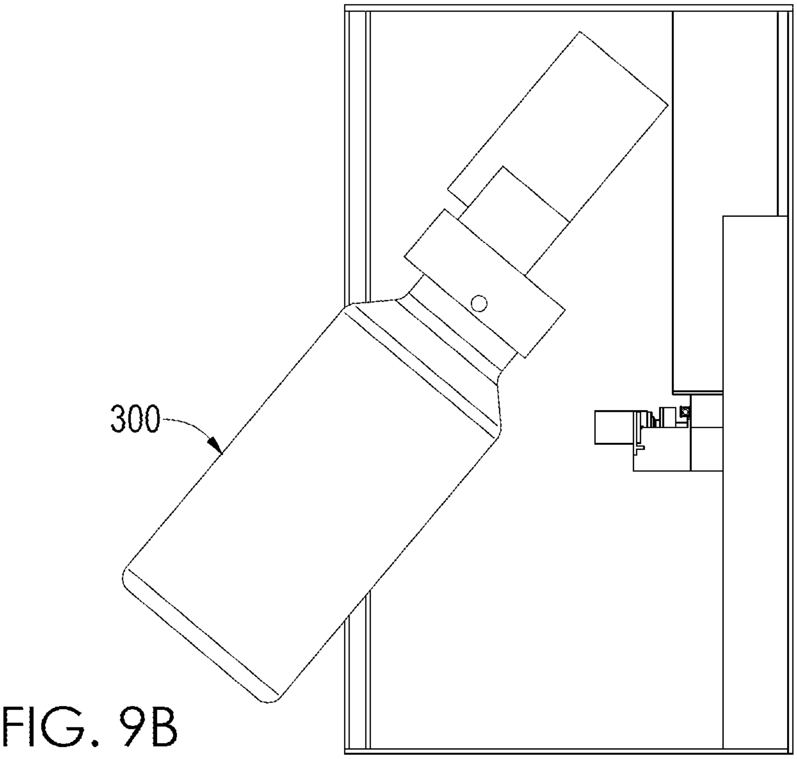

As shown in FIGS. 9A-9B, the cap of the storage tank 300 may optionally be attached to a pivoting mechanism to allow the storage tank 300 to be pivoted outwards from its normal in-use position (shown in FIG. 9A) into a position to facilitate removal and cleaning (FIG. 9B). The pivoted position shown in FIG. 9B accommodates the length of cooling core 320 and allows the storage tank to be removed from the cooling system 310 for periodic cleaning.

Figure 7:
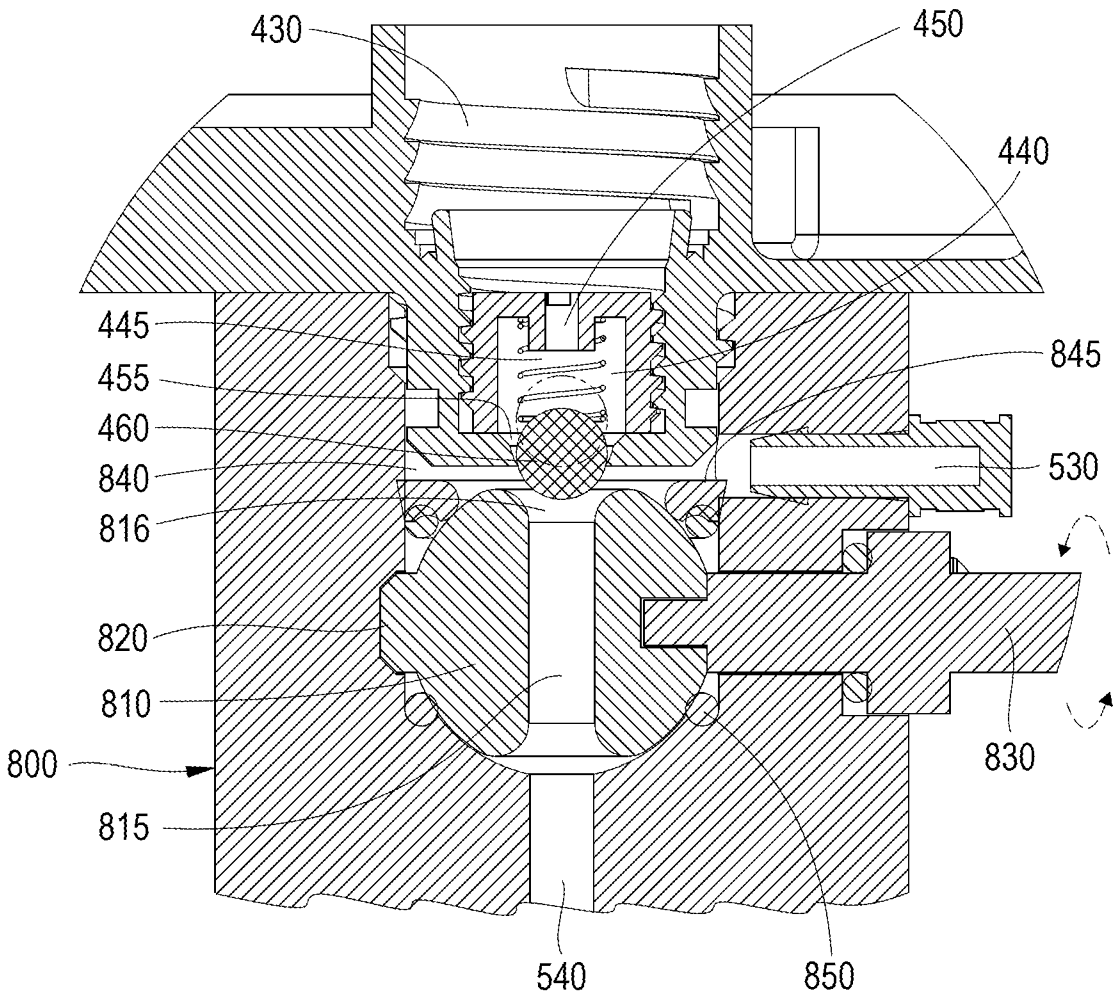
FIG. 7 is an enlarged sectional view of a portion of FIG. 5 and includes a cartridge ball.
Figure 8:
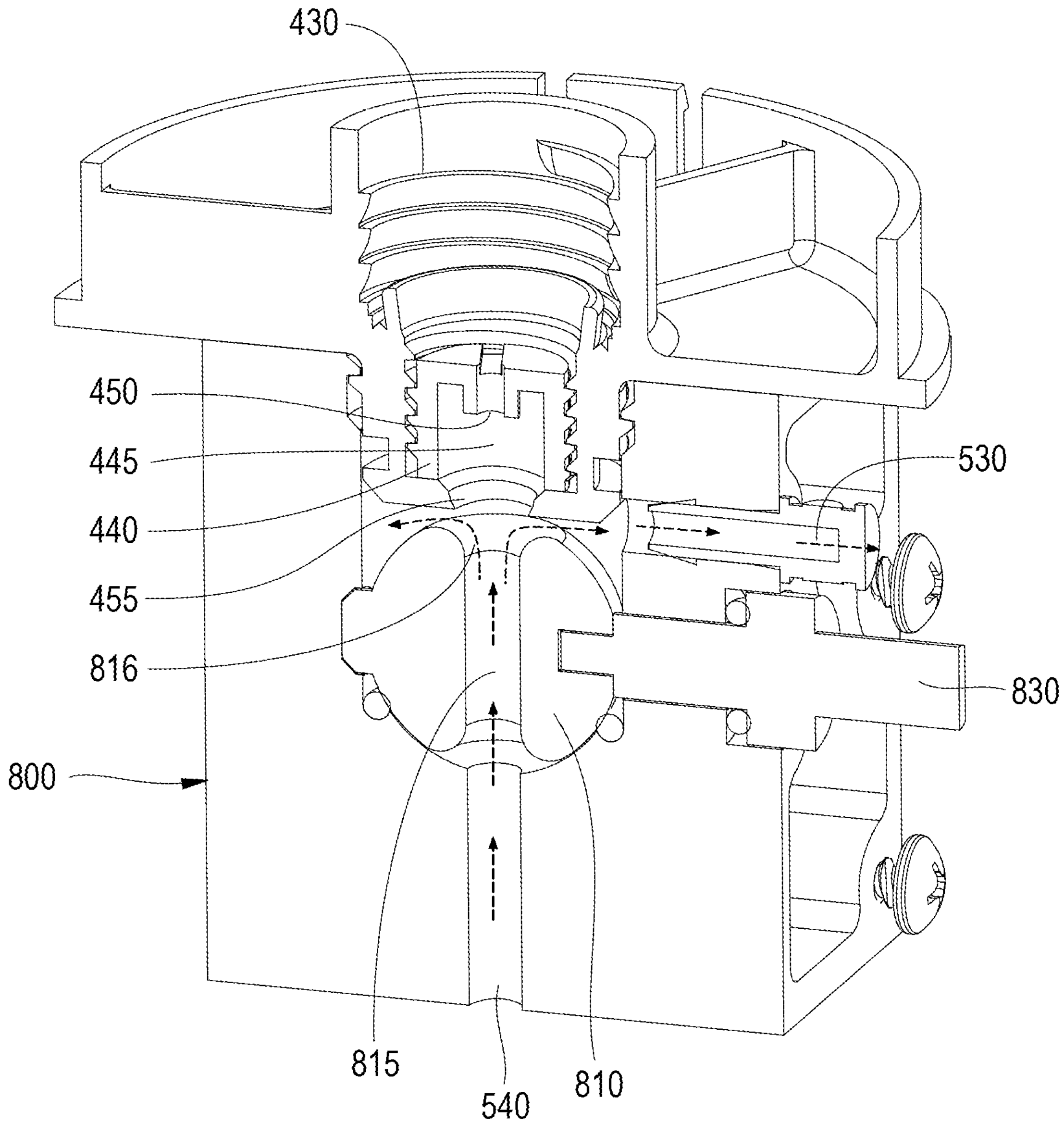
FIG. 8 is a sectional perspective view of the bottom of a cartridge and of a dosing pump of the embodiment of FIG. 1 and includes arrows illustrating the flow of fluid from a flush line.

As noted above, the beverage system 10 includes at least one and preferably two cartridges 400 that contain additives for mixing with the purified water to provide a desired beverage. In this embodiment, the additives are in liquid form and may be any desired flavoring, minerals, electrolytes, vitamins, nutritional supplements, and in some embodiments medicines, or any combination of the foregoing. In short, the additive may be any substance desired to be added to the fluid of storage tank 300 to create a beverage of choice. Also, as illustrated in FIGS. 1-2, the cartridges 400 (and the corresponding receptacles in the outer shell of beverage system 10 for receiving them) are preferably located near the front edge of the system to facilitate easy insertion and removal of the cartridges by a user. In a preferred embodiment, the cartridge 400 comprises tubular shell 410 surrounding a collapsible and removable bag 420 in which is disposed the additive. Such collapsible bags for holding and dispensing a fluid additive or concentrate through an opening in a fitting or threaded connector are known in the art. As shown in FIGS. 5-8, the shell 410 further comprises a fitting 430 which may be a threaded connector designed to receive and interlock with a complementary connector on the bag 420, for example, by a quarter turn of the bag. Beneath the fitting is a ball valve 440 comprising a first chamber 445 having an inlet 450 from the fitting 430 and an outlet 455 into dosing valve 800. As shown in FIG. 7, a cartridge ball 460 is disposed in the chamber 445. The opening into the chamber 445 of the outlet 455 is preferably sized and contoured to seamlessly receive the outer diameter of the cartridge ball 460 thus allowing it to block the fluid flow through it when the cartridge ball 460 is pressed against it. As shown, the chamber 445 is sufficiently sized to allow the cartridge ball 460 to move apart from the opening outlet 455 while leaving inlet 450 unobstructed thus allowing fluid flow between the two openings from the cartridge 300 into the dosing valve 800. As shown, the cartridge 300 is oriented vertically to allow any air bubbles to float to the top of the cartridge 300 while gravity feeding the additives in laminar flow through the first chamber 445 into the dosing valve 800. As can be appreciated from the above description and FIGS. 5-8, the gravity driven flow of additive from the cartridge 400 presses the cartridge ball 460 into and against the outlet 455 thus forming a seal and closing off the chamber 445. As described below, the dosing valve 800 is effective to move the cartridge ball upward to open and allow fluid to pass through the outlet 455.

The dosing valve 800 includes a dosing ball 810 with a tubular port 815 across its diameter and in a vertical orientation is in line with the outlet 455 from the cartridge 400. As shown, at least the upper opening 816 of the tubular port is enlarged so that the opening is larger in diameter than the cartridge ball 460, such that when the cartridge ball 460 is blocking the outlet 455 from the cartridge 400 there is a gap between the bottom of the cartridge ball 460 and the opening 816. The dosing ball 810 is coupled to a rotary shaft 830 on an axis perpendicular to the tubular port 815 and also includes a protrusion 820 opposite from and in line with the rotary shaft 830. The dosing ball 810 is disposed in a dosing chamber 840 sized and dimensioned to leave a gap between a substantial portion of the upper outside surface of the dosing ball 810. The rotary ball 810 is held at least partially in position in the dosing chamber 840 by a retainer 845. As shown, the lower portion of the dosing chamber 840 is a spherical cap closely dimensioned to the outer diameter of the dosing ball 810. An o-ring 850 is disposed at the junction of the spherical cap and the larger portion of the dosing chamber 840. An actuator 860, such as a solenoid motor, turns the rotary shaft 830 and the dosing ball 810 from a first position (shown in FIG. 7) in which the tubular portal 815 is in line with the outlet 455 and the cartridge ball 460 is permitted to block the outlet 455 by approximately ninety degrees to a second position in which the outer surface of the dosing ball 810 presses against the cartridge ball 460 and thus pushes it up and away from the outlet 455, thus opening the flow from the cartridge 300 into the dosing valve 800. The solenoid motor is in electrical communication with the electronics module 180.

A flush flow line 540 enters the bottom of the dosing chamber 840 in line with the tubular portal 815 of the dosing ball 810 when it is in a vertical orientation. As shown in FIG. 3, the flush flow line is supplied with purified water from the storage tank 300. Thus, when the dosing ball 810 is in the first position described above, purified water flows from the flush flow line and fills gap in the dosing chamber 840 between it and the dosing ball 810 as well as the surface of the cartridge ball 460 that protrudes through the outlet 455 into the dosing chamber 840.

A dosing line 530 exits an upper portion of the dosing chamber 840 and as described above and as illustrated in FIG. 3, converges with the main flow line 520. The dosing line 530 passes through and is operatively coupled to a dosing pump 700. In one embodiment the dosing pump 700 is a peristaltic pump, although other types of pumps or fluid actuators known in the art may be utilized. When actuated, the dosing pump 700 draws a precisely metered amount of fluid through the dosing line 530 and into the main flow line 520. Depending on the position of the dosing ball 810, this fluid will be either a metered amount of fluid additive from the cartridge 300 or a metered amount of purified water drawn from the flush flow line 540 through the tubular port 815 in dosing ball 810, as well as the purified water in the dosing chamber 840, and then into the dosing line 530.

Thus, rotation of the dosing ball 810 into the second position by the solenoid motor 850 to allow flow of additive from the cartridge 300 into the dosing chamber 840 in combination with activation of the dosing pump 700 draws a metered amount of additive into the dosing line 530 based on the action of the pump and amount of time the dosing ball 810 is held in the second position. When the dosing ball 810 is rotated back to the first position and the dosing pump 700 is activated, purified water is drawn through the dosing chamber 840 and into the dosing line 530 and the dosing pump 700. When the pump is deactivated with the dosing ball 810 in the first position, a known and precise amount of purified water is thus in stasis in the dosing chamber and dosing line 530. Importantly, when purified water is drawn from the flush flow line 540 after additive has drawn into the dosing line 530, the purified water washes essentially all additive from the dosing chamber 840, the exposed surface of the cartridge ball 460, and the dosing line 530. This effects a self-cleaning mechanism and process.

A user interface is provided via the electronics module 180 and the display 170. The interface presents a user with a menu to select a beverage, which may include options regarding the volume of the beverage, the amount (concentration) of the additive to be included in the beverage, whether to include in the beverage additive from only one cartridge 300 or multiple cartridges, and the ratio or blend of additive from each cartridge. The electronics module 180 serves as a controller and includes software to actuate and precisely control the motors, valves, and pumps described herein to provide the beverage as selected by the user. The software calibrates the user's concentration and mixture selection to activation of the dosing valve 800 and dosing pump 700 to precisely meter the required amount of additive. Likewise, the software is calibrated to activate the dispensing pump 600 or alternatively dispensing valve to dispense the required amount of purified water for the beverage. It is expected that in almost all cases purified water from the storage tank 300 will account for the vast majority of the fluid volume of a given beverage, i.e., ratio of additive to purified water will be relatively small. The dispensing pump 600 therefore is preferably a high-volume pump, in one embodiment capable of a flow rate of 8 liters per minute, and may be a diaphragm pump or other suitable precision fluid pump as known in the art. In an embodiment using the dispensing valve, the valve may be a solenoid actuated valve that is normally in the closed position. In either case, the dispensing pump 600 or dispensing valve operates to regulate flow of the supply fluid through the supply line 510 and into the main flow line 520, and in conjunction with the dosing valve 800 and dosing pump 700 through the flush flow line 540 as describe herein. The software further calculates and takes into account the volume of purified water in stasis in the dosing chamber 840 and dosing line 530 before activating the dosing valve 800, as well as the volume of purified water to cleanse the dosing valve 800 that is drawn by the dosing pump 700 after the required amount of additive is drawn into dosing line 530.

Thus, in operation, once a user has selected a desired beverage, the control software of electronics module 160 activates dispensing pump 600 to begin a flow of purified water and then activates one or more dosing valve(s) 800 and dosing pump(s) 700 to meter the precise amount of additive(s) as required by the selected beverage. The additive then flows through dosing line(s) 530 and converges with the flow ofpurified water in main flow line 520 (through which is flowing purified water) to form the dispensed flow stream 550. Once the required amount of additive has been metered, the software causes dosing valve 800 to actuate and rotate into the first position, in which purified water is drawn from flush flow line 540 through the dosing chamber and into dosing line 530, traveling behind the metered additive and thus cleansing the dosing valve 800, cartridge ball 460, dosing line 530, and dosing pump 700 of additive. This cleansing wash (which begins with purified water mixed with traces of additive and ends with purified water) then converges into the main flow line 520 to become part of dispensed flow stream 550 and is dispensed into the user's cup. As noted, the software takes into account the volume of the cleansing wash when calculating and calibrating the volume of purified water required for the selected beverage, and in some embodiments also accounts for the trace amounts of additives in the cleansing wash. In this way, embodiments of the present invention provide an automatic self-cleaning mechanism and process in which the cleansing wash itself is part of the dispensed beverage. Thus, there is no need for a separate discharge outlet and maintenance of the system is minimized.

In some embodiments, the hardware and software of electronics module 180 may include a number of recognition sensors and is operable to store and recall user data to individual profiles. In one embodiment, the system may recognize a user's cup or container, by a RFID chip or similar imbedded in the container, associate the container with a specific user and store the system dispense settings for that user to their individual profile, which may include their desired beverage settings based on time, date, or location. In another embodiment, the system may recognize a user's cell phone, via MAC address or similar, determine user's ID and store their data. Once stored, the system has the ability to recall the user's past settings. The system may be in operative communication with cloud-based software and storage for retrieving a user's profile. When the system recognizes the presence of the users container via said RFID or similar, or cell phone via said MAC address or similar, and display their past settings as preferred presets. It should be noted that sensors need only be in informational communication (electrical, electromagnetic (e.g., RF)) with the electronics module 180 and thus as needed or desired may be placed in locations other than the electronics module 180 itself.

It will be appreciated by those skilled in the art having the benefit of this disclosure that this method and apparatus for a beverage system has many uses and advantages beyond those disclosed herein. Furthermore, it should be understood that the drawings and detailed description herein are to be regarded in an illustrative rather than a restrictive manner, and are not intended to be limiting to the particular forms and examples disclosed.

What is claimed is:

1. A beverage apparatus comprising:

a supply line receiving a source of fluid;

a dosing line;

a main flow line coupled to each of the supply line and the dosing line and having a beverage outlet;

a valve comprising a chamber having an opening for receiving a fitting associated with a cartridge containing an additive, a fluid inlet coupled to the supply line, an outlet coupled to the dosing line, and a dosing ball disposed within the chamber and between the opening, the fluid inlet, and the outlet and configured to rotate from a first position to a second position, the dosing ball comprising a tubular port substantially perpendicular to the axis of rotation of the dosing ball, wherein in the first position the port permits fluid to flow from the fluid inlet to the outlet and in the second position the dosing ball permits additive to flow from the fitting to the outlet.

2. The apparatus of claim 1, wherein in the first position, upon exiting the port, fluid flows across a surface of the fitting exposed in the opening thereby cleansing the exposed surface of any additive disposed on it.

3. The apparatus of claim 2, wherein the fluid is purified water.

4. The apparatus of claim 2, further comprising a dosing pump coupled to the dosing line and a controller, the controller configurable to control fluid flow through the supply line to supply a predetermined amount of fluid to the main flow line for a beverage and to actuate the valve into the second position while actuating the dosing pump to dispense a predetermined amount of additive through said dosing line to the main supply line, and to actuate the valve into the first position while actuating the dosing pump to flush a predetermined amount of fluid through the dosing line and to the main supply line.

5. The apparatus of claim 4, wherein said predetermined amount of fluid flushed through the dosing line is dispensed into a beverage, thereby cleansing said valve, dosing line, and main line without a drain.

6. The apparatus of claim 2, further comprising a fluid purification system in line with the supply line for purifying the fluid received from the source.

7. The apparatus of claim 1, wherein the fitting for receiving the cartridge is positioned above the valve to permit gravity flow of the additive from the cartridge into the valve.

8. The apparatus of claim 7, wherein the fitting is adapted for a removable cartridge.

9. The apparatus of claim 1, further comprising at least a second valve associated with a second cartridge.

10. The apparatus of claim 1 further comprising a cooling system in line with the supply line, comprising a removable storage tank with a cap, wherein the cap comprises an integrated heat exchanger and a cooling core extending into the storage tank.

11. A beverage apparatus comprising:

a supply line receiving a source of fluid and coupled to a dispensing valve for regulating the flow of the fluid through the supply line;

a dosing line coupled to a dosing valve for alternatively receiving fluid from the supply line or from a source of additive and coupled to a dosing pump for metering the flow of the fluid or additive through the dosing line;

a main flow line in fluid communication with each of the supply line and the dosing line and having a beverage outlet;

a controller operatively coupled to the dispensing valve, the dosing valve, and the dosing pump, the controller configurable to actuate the dispensing valve to supply a predetermined amount of fluid to the main flow line for a beverage, to actuate the dosing valve and dosing pump to dispense a predetermined amount of additive through the dosing line to the main supply line, and to actuate the dosing valve and dosing pump to flush a predetermined amount of fluid through the dosing line and to the main supply line for dispensation into a beverage container, such that the dosing valve, dosing line, and main supply line may be cleansed during the preparation of a beverage without the need for a drain.

12. The beverage apparatus of claim 11, wherein said dosing valve comprises a chamber having an opening for receiving a fitting associated with a cartridge containing the additive, a fluid inlet coupled to the supply line, an outlet coupled to the dosing line, and a dosing ball disposed within the chamber and between the opening, the fluid inlet, and the outlet and configured to rotate from a first position to a second position in response to the controller, the dosing ball comprising a tubular port substantially perpendicular to the axis of rotation of the dosing ball, wherein in the first position the port permits fluid to flow from the fluid inlet to the outlet and in the second position the dosing ball permits additive to flow from the fitting to the outlet.

13. The apparatus of claim 12, wherein in the first position, upon exiting the port, fluid flows across a surface of the fitting exposed in the opening thereby cleansing the exposed surface of any additive disposed on it.

14. The apparatus of claim 13, wherein the fitting for receiving the cartridge is positioned above the dosing valve to permit gravity flow of the additive from the cartridge into the valve.

15. The apparatus of claim 12, further comprising a fluid purification system in line with the supply line for purifying the fluid received from the source.

16. The apparatus of claim 11, wherein the fitting is adapted for a removable cartridge.

17. The apparatus of claim 11, further comprising at least a second dosing valve associated with a second cartridge.

18. The apparatus of claim 11, further comprising a cooling system in line with the supply line, comprising a removable storage tank with a cap, wherein the cap comprises an integrated heat exchanger and a cooling core extending into the storage tank.

19. A beverage system comprising a beverage apparatus configurable to dispense a beverage prepared in response to a selection of settings; and a container comprising a wireless communications device from which the beverage apparatus may receive information associated with at least one set of selected settings, wherein the beverage apparatus comprises a supply line receiving a source of fluid;

a dosing line;

a main flow line coupled to each of the supply line and the dosing line and having a beverage outlet;

a valve comprising a chamber having an opening for receiving a fitting associated with a cartridge containing an additive, a fluid inlet coupled to the supply line, an outlet coupled to the dosing line, and a dosing ball disposed within the chamber and between the opening, the fluid inlet, and the outlet and configured to rotate from a first position to a second position, the dosing ball comprising a tubular port substantially perpendicular to the axis of rotation of the dosing ball, wherein in the first position the port permits fluid to flow from the fluid inlet to the outlet and in the second position the dosing ball permits additive to flow from the fitting to the outlet.

* * * * *